Figure 1:
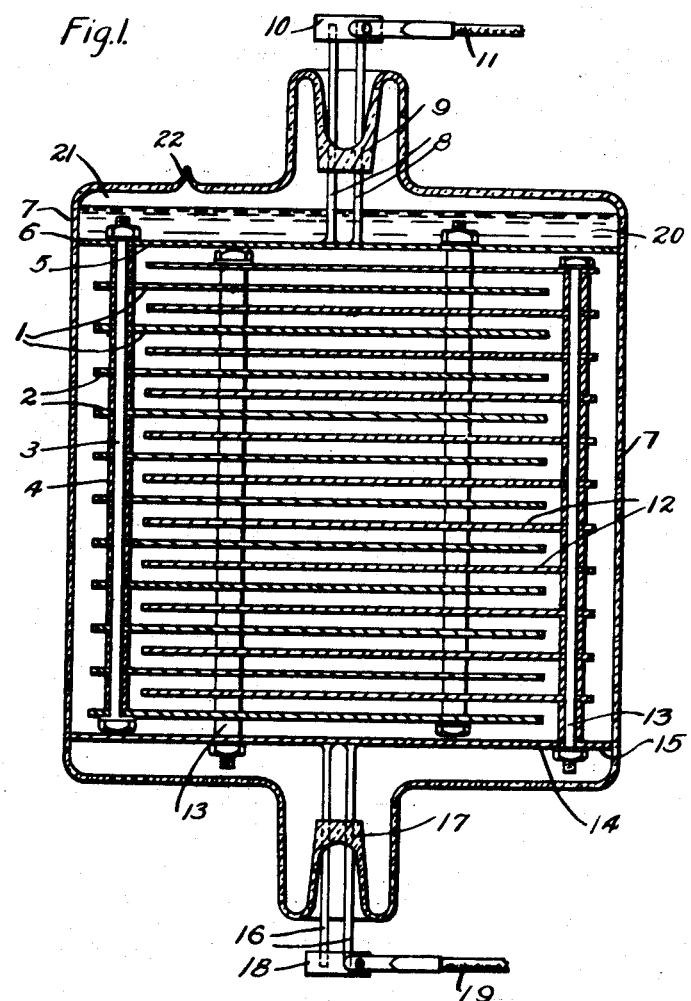

July 12, 1927.

R. E. MARBURY 1,635,556

CONDENSER

Filed Jan. 16, 1924

WITNESSES:

INVENTOR
Ralph E. Marbury
BY
ATTORNEY

Patented July 12, 1927.

1,635,556

UNITED STATES PATENT OFFICE.

RALPH E. MARBURY, OF WILKINSBURG, PENNSYLVANIA, ASSIGNOR TO WESTINGHOUSE ELECTRIC & MANUFACTURING COMPANY, A CORPORATION OF PENNSYLVANIA.

CONDENSER.

Application filed January 16, 1924. Serial No. 686,543.

My invention relates to condensers and more particularly to the type known as high-frequency condensers.

Condensers of this type are used for various kinds of service. My invention is adapted to be used in connection with high-frequency currents, as in radio transmission apparatus, and where it is important to avoid all possible energy losses which occur, to some extent, as heat in the dielectric material between the plates and in the casing.

A suitable condenser wherein some of the defects were eliminated was that of the type wherein the condenser plates were immersed in oil in a metal case. In such a condenser, it was not possible to effectively use the maximum energy input because losses occurred in the parts which maintained the plates in spaced relation.

Hitherto, in condensers enclosed in metal cases and in which the terminals were brought out through bushings of insulating material, eddy current losses took place in the cases and dielectric losses occurred in the bushings. In condensers of previous design wherein the cases were made of insulating material, dielectric losses still occurred in the bushings in the covers and in the dielectric material between the plates. The losses occurring with every period of charge and discharge of the condenser are proportional to the energy stored. When the current frequency is high and the energy is large, the losses are great per unit volume of the material comprising the condenser. The losses manifest themselves as heat and when sufficiently great, the solid materials comprising the condenser such as the solid insulation and bushings are destroyed thereby.

I avoid heating in the solid plate spacing material by avoiding the use of solid dielectric material between the condenser plates. The losses in the casing and terminal bushings are practically eliminated by reducing the voltage gradient between the terminals and by avoiding the use of bushings.

One object of my invention is, therefore, to provide a condenser which shall be suitable for large high-frequency currents where there is a high voltage between the terminals, and capable of storing a large amount of energy in a small space and which shall operate at relatively low temperature.

Another object of my invention is to provide a condenser, the dielectric of which shall be well protected from moisture.

Still another object of my invention is to provide a condenser which shall have a high volt ampere capacity and which shall be easily and cheaply constructed.

My invention comprises a plate structure of the oil immersed type, in which practically all losses except those in the oil are eliminated. The structure is supported by the walls of the casing and by the terminal connectors which are sealed in opposite ends of the casing. The combination provides a condenser in which the use of bushings is avoided and eddy current losses in the casing are practically eliminated.

I provide a fluid dielectric condenser with a closed case of dielectric material so constructed that the potential gradient in the entire casing is reduced. By this means, the losses external to the fluid dielectric, and especially the losses which occurred in the insulating terminal bushings of the prior art, are reduced to an extremely low value. Consequently, the total losses and the heat generated are so small that I am enabled to handle a large quantity of energy per unit volume of condenser, which is desirable in connection with high-frequency currents.

Figure 2:
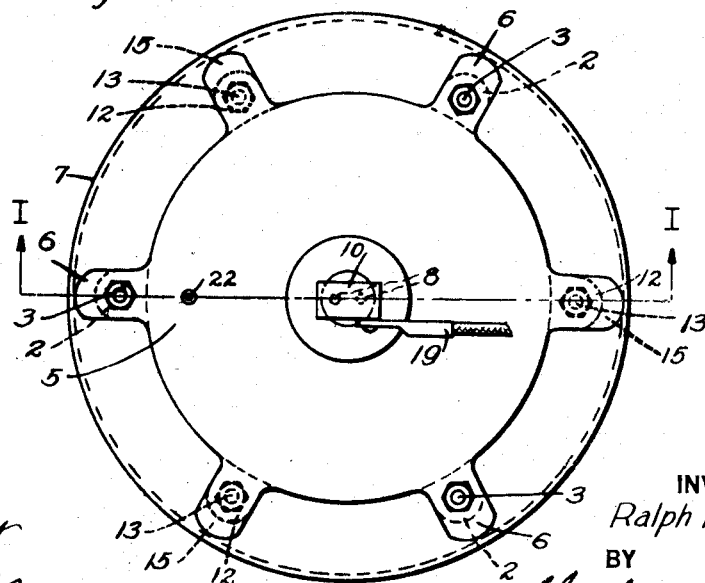

In the drawings constituting a part hereof, and in which like characters designate like parts, Figure 1 is a cross-sectional view of my condenser along the line I—I of Fig. 2, and Fig. 2 is a plan view of my condenser.

My condenser comprises two sets of parallel metal plates which are connected to form the two opposed plate structures. One of the plate structures consists of metal plates 1 which are provided with projections or ears 2. The plates are spaced on bolts 3 by means of metal bushings 4 or by welding them directly to the rods. The end plate 5 is provided with ears 6 which are longer than the ears on the other plates and they serve to bear against the walls of a glass casing 7 and to hold the plates in alignment. Leading-in wires 8 of tungsten, for example, are welded on the end plate 5 and pass through a seal 9 in one end of the glass casing 7. The wires serve both as a support for the plate structure and as connectors.

Externally, the wires 8 are attached to a connector 10 and to the conductor 11.

The opposite plates 12 are similarly spaced and attached to bolts 13. The end plate 14, which has projecting ears 15, is similarly supported and is attached to another set of wires 16 which pass through a seal 17 in the opposite end of the glass casing. The wires 16 are connected to a terminal 18 and a conductor 19.

The plates are immersed in oil 20, or other fluid dielectric. A space 21 is left in the end of the casing and the casing is sealed at the point 22. The air or other gas in the space 21 is normally at atmospheric pressure but when the oil becomes heated, the air expands and serves to increase the breakdown voltage of the fluid dielectric, by reason of the increased pressure.

I have provided an enclosed fluid dielectric condenser in which the casing is of dielectric material and the walls of the casing maintain the plates in longitudinal adjustment. Solid dielectric separators between the plates and the losses resulting from their use are eliminated. The terminal connections are sealed into the casing at remote ends thereof, and they maintain the plate structures in lateral adjustment. The condenser, as constituted, practically eliminates losses and heating external to the fluid dielectric.

Although I have shown a specific embodiment of my invention, I do not wish to be limited thereto. I may use a casing of other dielectric material than glass or other means of sealing the terminals in the casing. I may enclose gases other than air in the casing to produce a pressure on the oil in excess of atmospheric pressure in order to increase the breakdown strength of the oil. Other various modifications of my invention will suggest themselves to those skilled in the art without departing from the spirit thereof, the scope of which is defined in the annexed claims.

I claim as my invention:

1. A low-loss condenser comprising a group of a plurality of condenser plates, conducting connecting means rigidly connecting said group of plates together in parallel spaced relation, a second group of the same number of condenser plates, conducting connecting means rigidly connecting said second group of plates together in parallel spaced relation, a container comprising a tubular insulating wall, said groups of plates being assembled with the plates of one group interpersed between the plates of another group, whereby one end plate belongs to one group and the other end plate belongs to the other group, means for rigidly supporting said groups from said end plates, respectively, and a liquid dielectric in said container.

2. A low-loss condenser comprising a group of a plurality of condenser plates having ears extending from the edges thereof, conducting connecting means engaging said ears for rigidly connecting said group of plates together in parallel spaced relation, a second group of the same number of condenser plates having ears extending from the edges thereof, conducting connecting means engaging said ears for rigidly connecting said second group of plates together in parallel spaced relation, a container comprising a tubular insulating wall, said groups of plates being assembled with the plates of one group interpersed between the plates of another group, whereby one end plate belongs to one group and the other end plate belongs to the other group, means for rigidly supporting said groups from said end plates, respectively, the ears of all the end plates except the end plates being spaced from said tubular insulating wall, and a liquid dielectric in said container.

3. A low-loss condenser comprising a group of a plurality of condenser plates having ears extending from the edges thereof, conducting connecting means engaging said ears for rigidly connecting said group of plates together in parallel spaced relation, a second group of the same number of condenser plates having ears extending from the edges thereof, conducting connecting means engaging said ears for rigidly connecting said second group of plates together in parallel spaced relation, a container comprising two end walls connected by a tubular insulating wall, said groups of plates being assembled with the plates of one group interspersed between the plates of another group, whereby one end plate belongs to one group and the other end plate belongs to the other group, end terminals supported by said container and joined to said end plates for supporting said groups of plates, respectively, and a liquid dielectric in said container.

4. A fluid dielectric condenser comprising a plurality of parallel plate members alternately connected, a sealed container of dielectric material maintaining the plates in spaced relation, a pair of terminals sealed into one end of said container for supporting one set of plates, and another pair of terminal connectors sealed into the opposite end of the casing for supporting the other set of plates.

5. An electrostatic condenser comprising a hermetically sealed container, a liquid dielectric therein, and spaced condenser plates immersed in said dielectric, the arrangement being such that the liquid is automatically put under increased pressure when the temperature is increased.

6. A condenser comprising a sealed casing of dielectric material, a plurality of alternately connected, spaced plate members therein, oil dielectric in said casing, and a gas chamber in said casing to increase the pressure and to maintain the breakdown voltage of said dielectric when it is heated.

7. A condenser comprising a sealed glass casing of dielectric material, a plurality of spaced plate members therein, oil dielectric in said casing, and a gas chamber in said casing to increase the pressure and to maintain the breakdown voltage of said dielectric when it is heated.

8. A condenser comprising a sealed casing a dielectric material, a plurality of alternately connected metallic plates therein, terminal wires sealed into the ends of said casing for respectively supporting the sets of said plates, oil dielectric in said casing and a gas chamber in said casing to increase the pressure and to maintain the breakdown voltage in said dielectric when it is heated.

9. An electrostatic condenser comprising a plurality of metallic plate members alternately connected, a sealed casing of dielectric material, a fluid dielectric in said casing, a gas space in said casing which increases the pressure on said fluid when heated and terminals sealed in opposite ends of the casing so constituted as to substantially eliminate energy losses in the casing.

10. An electrostatic condenser comprising a plurality of metallic plate members alternately connected, a sealed glass casing, a fluid dielectric in said casing, a gas space in said casing which increases the pressure on said fluid when heated and terminals sealed in opposite ends of the casing so constituted as to substantially prevent energy losses in the casing.

11. An electrostatic condenser comprising a plurality of metallic plate members alternately connected, a fluid dielectric, a sealed casing of dielectric material containing said dielectric and plates and engaging the edges of some of said plates, a gas space in said casing and terminals in opposite ends of said casing supporting said plates and minimizing energy losses in said casing.

12. An electrostatic condenser comprising a plurality of metallic plate members alternately connected, a fluid dielectric, a sealed glass casing containing said dielectric and plates and engaging the edges of some of said plates, a gas space in said casing and terminals in opposite ends of said casing supporting said plates and minimizing the energy losses in said casing.

In testimony whereof, I have hereunto subscribed my name this 8th day of January, 1924.

RALPH E. MARBURY.